(12) United States Patent
Subat

(10) Patent No.: US 9,174,559 B2
(45) Date of Patent: Nov. 3, 2015

(54) HEADREST

(71) Applicant: Bose Corporation, Framingham, MA (US)

(72) Inventor: Brad Subat, Northborough, MA (US)

(73) Assignee: Bose Corporation, Framingham, MA (US)

( * ) Notice: Subject to any disclaimer, the term of this patent is extended or adjusted under 35 U.S.C. 154(b) by 37 days.

(21) Appl. No.: 13/943,190

(22) Filed: Jul. 16, 2013

(65) Prior Publication Data

US 2015/0021968 A1 Jan. 22, 2015

(51) Int. Cl.
*B60N 2/48* (2006.01)

(52) U.S. Cl.
CPC ................ *B60N 2/4885* (2013.01); *B60N 2/48* (2013.01); *B60N 2002/4897* (2013.01)

(58) Field of Classification Search
CPC ...................................................... B60N 2/4885
USPC ..................................... 297/216.12, 391, 408
See application file for complete search history.

(56) References Cited

U.S. PATENT DOCUMENTS

| | | | |
|---|---|---|---|
| 3,528,703 A * | 9/1970 | Ohta | 297/391 |
| 3,680,912 A | 8/1972 | Matsuura | |
| 3,706,472 A * | 12/1972 | Mertens | 297/397 |
| 5,645,320 A * | 7/1997 | Jones | 297/410 |
| 6,412,872 B2 * | 7/2002 | Takeda et al. | 297/391 |
| 7,090,292 B2 | 8/2006 | Dellanno | |
| 7,931,331 B2 | 4/2011 | Gomes et al. | |
| 8,469,445 B2 | 6/2013 | Hertl | |
| 2005/0001463 A1 * | 1/2005 | Yetukuri et al. | 297/391 |
| 2009/0315372 A1 * | 12/2009 | Tracht | 297/216.12 |
| 2012/0007403 A1 | 1/2012 | Menges et al. | |
| 2013/0313880 A1 * | 11/2013 | Shamoto | 297/391 |

FOREIGN PATENT DOCUMENTS

| | | |
|---|---|---|
| FR | 2786141 A1 | 5/2000 |
| JP | S61163549 U | 10/1986 |
| WO | 2012133677 A1 | 10/2012 |

OTHER PUBLICATIONS

The International Search Report and the Written Opinion of the International Searching Authority mailed on Oct. 17, 2014 for corresponding PCT Application No. PCT/US2014/046135.

* cited by examiner

*Primary Examiner* — Peter Brown
(74) *Attorney, Agent, or Firm* — Brian M. Dingman; Dingman, McInnes & McLane, LLP

(57) ABSTRACT

A headrest that is constructed and arranged to be mounted to one or more support rods that are adapted to be coupled to the backrest of a seat of a vehicle. The headrest has a main body portion and a separate bushing that is positioned at least partially in the main body portion. The bushing has a receptacle that is adapted to receive a portion of a support rod. The bushing is constructed and arranged to partially damp forces that are coupled to the bushing through the main body portion.

17 Claims, 6 Drawing Sheets

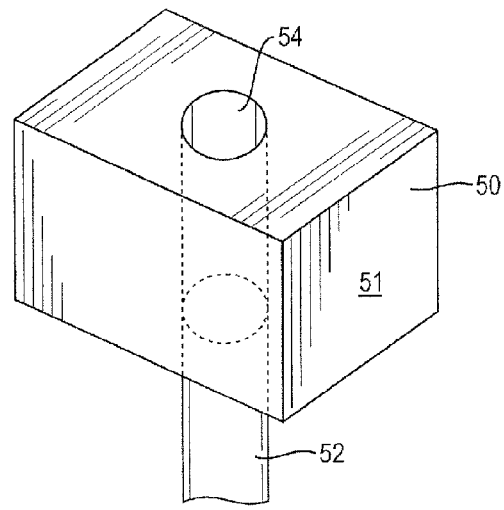
FIG. 4
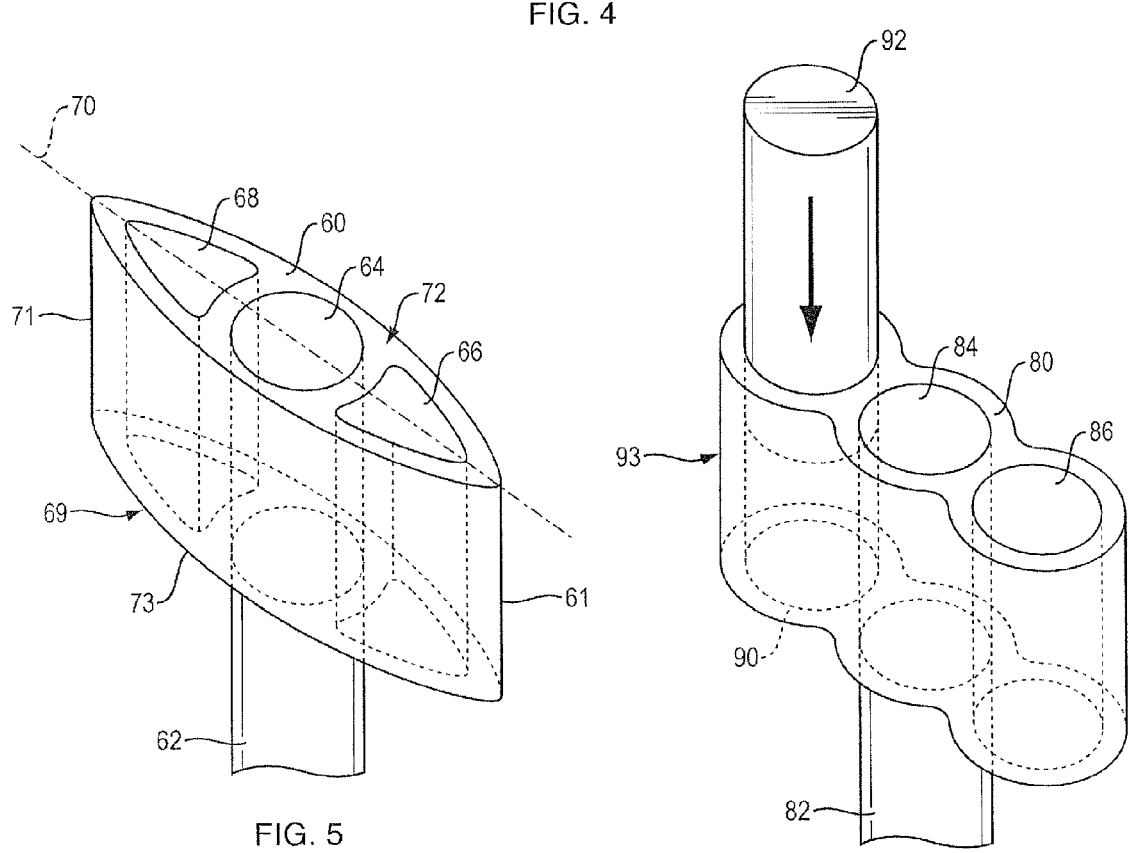
FIG. 5
FIG. 6

HEADREST

BACKGROUND

This disclosure relates to a headrest for the seat of a motor vehicle.

Headrests are used in motor vehicles to support the head in a way so as to reduce injuries during a crash. Headrests must absorb energy and have a maximum compressional displacement when force is applied, while still having sufficient compliance to return back to the initial position fairly quickly once the force is released. Foam headrests can meet these functional requirements. However, when stiff structures are embedded in the headrest there is less depth available for the foam thus the requirements are more difficult to meet.

SUMMARY

The innovations disclosed herein result in part from the realization that the energy absorption and compliance requirements of motor vehicle headrests that comprise stiff internal structures can more readily be achieved by coupling the headrest support rods to the headrest via bushings that damp forces and achieve a desired spring constant. Both the material and the design of the bushings can contribute to the energy absorption and compliance characteristics or spring constant of the bushing, and thus of the headrest with the bushings. A non-limiting example of a headrest with a stiff internal structure (such as a core assembly comprising loudspeakers) that can benefit from the innovations disclosed herein is shown and described in U.S. patent application Ser. No. 13/907,428 filed on May 31, 2913, the disclosure of which is incorporated herein by reference.

All examples and features mentioned below can be combined in any technically possible way.

In one aspect, a headrest that is constructed and arranged to be mounted to one or more support rods that are adapted to be coupled to the backrest of a seat of a vehicle includes a main body portion and a separate bushing that is positioned at least partially in the main body portion. The bushing has a receptacle that is adapted to receive a portion of a support rod. The bushing is constructed and arranged to partially damp forces that are coupled to the bushing through the main body portion of the headrest.

Embodiments may include one of the following features, or any combination thereof. The receptacle may comprise a socket that is adapted to receive and retain an end of a post. The bushing may be at least partially made from elastomeric material. The bushing may further comprise one or more chambers adjacent to the receptacle. The bushing may have a front that faces the head of a person sitting in front of the headrest and a rear that opposes the front, and a first chamber may be located between the receptacle and the front of the bushing. A second chamber may be located between the receptacle and the rear of the bushing. The first and second chambers and the receptacle may be located along an axis that is transverse to the front and back of the bushing. The first and second chambers and the receptacle may all have generally the same cross-sectional shape, which may be generally circular.

Embodiments may include one of the following additional or alternative features, or any combination thereof. The bushing may have a periphery, and one or more of the chambers may be open to the periphery of the bushing. Alternatively, one or more of the chambers may be completely embedded in the main body portion and not open to the periphery. One or more of the chambers may be generally cylindrical. The bushing may have a top and a bottom, wherein the top and bottom are not the same size and wherein the bushing has one or more sidewalls that define the periphery of the bushing between the top and the bottom. The top may be smaller than the bottom and the sidewalls may flare outwardly from the top to the bottom. The flare may follow a generally straight line or a generally curved line.

Embodiments may include one of the following additional or alternative features, or any combination thereof. The bushing may comprise a unitary bushing body that is made from a first solid material and that defines one or more chambers, and at least one chamber may contain a second, different solid material that damps forces differently than the first material. The main body portion may have a bushing-receiving cavity in which the bushing is located. The bushing-receiving cavity may have a size and a shape and the bushing may have a size and a shape, where one or more of the size and shape of the bushing is different from those of the cavity such that when the bushing is inserted into the cavity an interference fit is created. The headrest may further comprise structure to assist with maintaining the bushing in the bushing-receiving cavity.

In another aspect, a headrest that is constructed and arranged to be mounted to one or more support rods that are adapted to be coupled to the backrest of a seat of a vehicle, includes a main body portion and a separate bushing that is positioned at least partially in the main body portion and that has a receptacle that is adapted to receive a portion of a support rod, the bushing constructed and arranged to partially damp forces that are coupled to the bushing through the main body portion, wherein the bushing is made at least in part from an elastomeric material and comprises at least two chambers adjacent to the receptacle, wherein the bushing has a front that faces the head of a person sitting in front of the headrest and a rear that opposes the front, and wherein a first chamber is located between the receptacle and the front of the bushing and a second chamber is located between the receptacle and the rear of the bushing. The main body portion has a bushing-receiving cavity in which the bushing is located.

BRIEF DESCRIPTION OF THE DRAWINGS

FIG. 4 illustrates a bushing for a headrest.
FIG. 5 illustrates a bushing for a headrest.
FIG. 6 illustrates a bushing for a headrest.

DETAILED DESCRIPTION

In headrests with an internal stiff structure that is decoupled from the headrest mounting bars or support rods, using an energy absorbing bushing to couple the support rods to the headrest can help to achieve a desired energy absorption and compliance profile of the headrest. The bushings can be received in the main body portion of the headrest. The bushings include a receptacle that is adapted to receive a portion of a support rod as a means to couple the support rods to the headrest. The bushings are constructed and arranged to partially damp forces that are coupled to the bushing through the main body portion. The damping, compliance and hysteresis characteristics of the bushing can be accomplished by one or more of the construction of the bushing, the material or materials from which the bushing is made, and the presence, construction and arrangement of one or more chambers in the bushing that provide a means for adjusting the energy absorption, compliance and/or hysteresis of the bushing.

Figure 1:
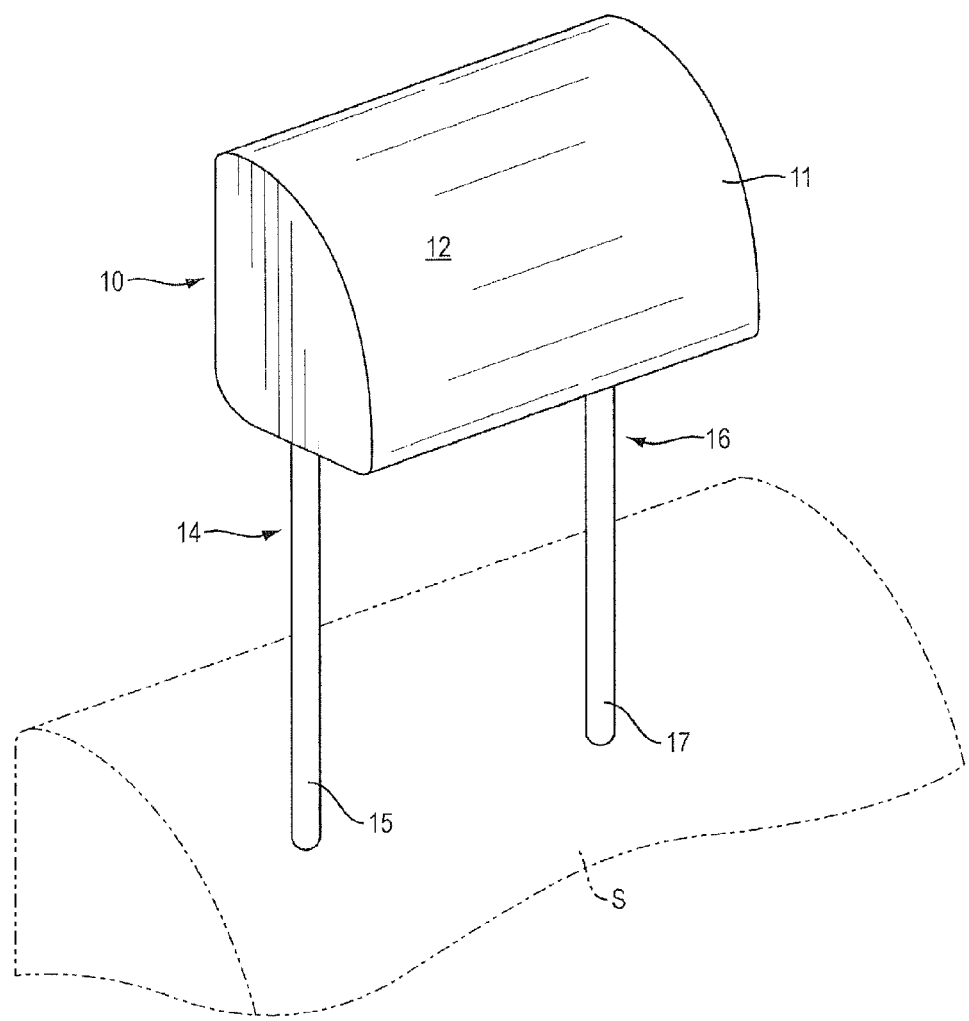
FIG. 1 shows a headrest.
Figure 2:
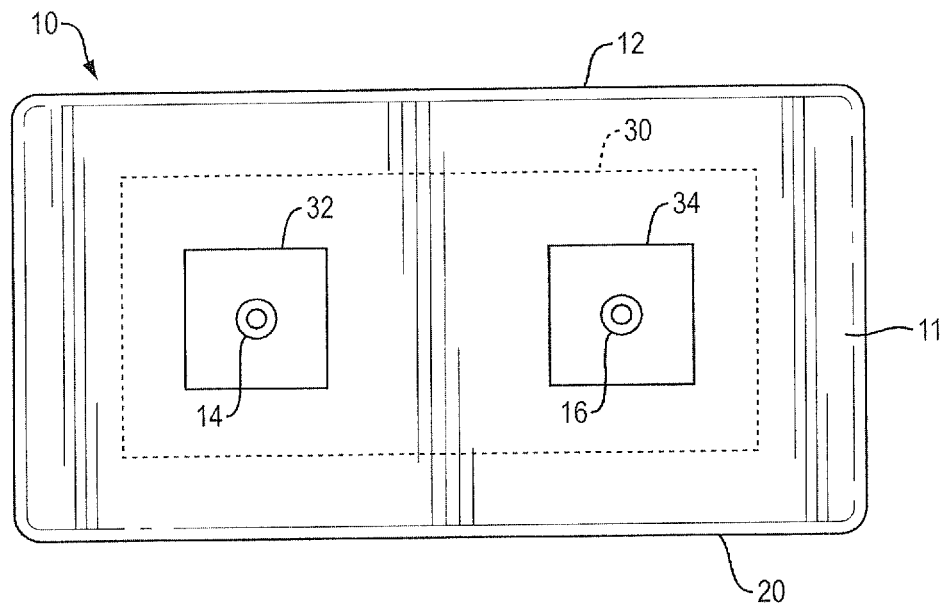
FIG. 2 is a bottom view of the headrest of FIG. 1.

A headrest 10 is shown in FIG. 1. Headrest 10 includes a main body portion 11 with a front facing surface 12. Headrest 10 is constructed and arranged to be mounted to support rods 14 and 16 that have ends 15 and 17 which are received in and coupled to the backrest or seatback of motor vehicle seat S. In the bottom view of FIG. 2, bushings 32 and 34 are visible. The bushings are positioned fully or at least partially in the main body portion 11 and have a receptacle that is adapted to receive a portion of a support rod 14 and 16. The bushings are constructed and arranged to partially damp forces that are coupled to the bushing through the main body portion. Stiff core assembly 30 is embedded in main body portion 11. Bushings 32 and 34 are located between support rods 14 and 16 and core assembly 30. In one non-limiting example, the core assembly can have in its bottom portion the cavities in which the bushings are located.

Several non-limiting examples of bushings that can be used in the headrest are shown in FIGS. 3 through 11. The design of the bushings, their size, and their location relative to the stiff structures in the headrest, are varied to achieve desired characteristics of the headrest. Without limiting the generality of this disclosure, the relative height of the bushings to the headrest may be in the range of from about 15 to about 50%.

Figure 3:
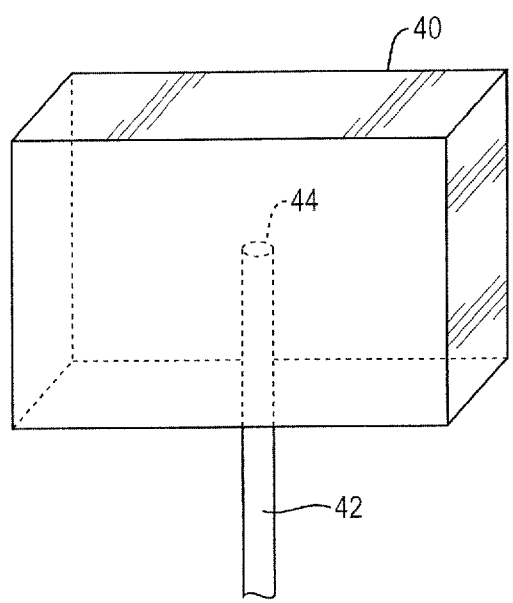
FIG. 3 illustrates a bushing for a headrest.

As a first example, bushing 40, FIG. 3, is a solid block of material that defines receptacle or cavity 44 in which the top end of headrest support rod 42 is received. Cavity 44 is closed at the top end. Bushing 40 can be made from a material that has both energy absorption and compliance characteristics such that it contributes to the energy absorption accomplished by the headrest, and has a desirable deflection and compliance and hysteresis functionality. Examples of materials that exhibit both elasticity and energy absorption are viscoelastic polymers (elastomers), foamed micro-cellular polyurethane elastomers, polyvinyl acetates, and high temperature vulcanized silicone rubbers, to name a few of many materials and polymer materials which absorb energy and exhibit compliance with low hysteresis. The materials(s) from which the bushing is made may be compressible. The innovation herein is not limited to any type or class of material or any materials per se, rather the bushing herein is constructed and arranged to partially damp forces so as to help achieve the necessary functional characteristics of the headrest.

A similar example is illustrated by bushing 50, FIG. 4. Bushing 50 is a solid body that is typically uniform in construction and may be molded or extruded from a viscoelastic material including but not limited to those of the types described above. Through-hole receptacle 54 is adapted to receive a portion of support rod 52 as one way to couple the bushing to the support rod.

A rectangular parallelepiped shape of bushing 50 is illustrated but is not limiting of the shape of the bushing. The main body portion of the headrest in which the bushing is received is constructed and arranged to have cavities that receive the bushings. The cavities are typically in the bottom of the headrest. The cavities are located such that the bushings are between the headrest support rods and any stiff structure that is embedded in the headrest. The size, shape material and compliance of the bushing is designed relative to the size and shape of the cavity to create a desired location of the bushing, a desired fit of the bushing into the main body portion of the headrest and a pre-loading of the bushing that can contribute to its compliance and energy absorption. The bushing and the bushing-receiving cavity are designed such that the bushing is held sufficiently tightly within the main body portion of the headrest such that it does not twist or tend to pop out of the main body portion upon the application of the types of forces that are seen by the headrest per the relevant governmental regulations that relate to motor vehicle seat headrests.

FIG. 5 illustrates a bushing 60 that has both a different shape as well as the inclusion of one or more chambers that affect the energy absorption and/or compliance characteristics of the bushing. In this non-limiting case, bushing 60 includes cylindrical through-hole receptacle 64 which can be created, for example, via extrusion, injection molding, or a post-process such as punching or drilling. Receptacle 64 is constructed sized and arranged to properly fit and hold the end of headrest support rod 62. The generally tapered or generally elliptical shape of main body portion 69 is arranged such that the long axis 70 lies along a direction that is transverse to and potentially orthogonal to the front and rear surfaces of the headrest. This arrangement places first chamber 66 between receptacle 64 and the front 61 of the main body portion 69 and the second chamber 68 between receptacle 64 and the rear 71 of main body portion 69. When a force is applied to the front of a headrest that contains bushing 60 (e.g., by the head of a person seated in the seat with the headrest during a rear-end collision), the force will be coupled to front 61 of the bushing. The material from which the bushing is made and the number, size, shape and location of the one or more chambers contribute to the damping and spring constant of the bushing. In this case, the tapered shape of chambers 66 and 68 and their open nature (i.e., the fact that they are open to the periphery of main body portion 69 both at the top 72 and bottom 73 of the body) all contribute to the effect that the chambers have on both the compliance and energy absorption accomplished by the bushing.

Another bushing design with chambers both to the front and rear of the support rod is shown in FIG. 6. However, it should be understood that the bushing can have no chambers, one chamber, or more than two chambers, and the chambers do not need to be located in front of and/or in back of the support rod. In the case of bushing 80, FIG. 6, support rod 82 is received in cylindrical through-hole receptacle 84 that is centered in main body portion 93. Chambers 86 and 90 are in front of and to the rear of receptacle 84. In this non-limiting example, chambers 86 and 90 and receptacle 84 each have generally the same cross sectional shape, which in this case is circular or generally circular. This figure also illustrates an option where the functionality of the bushing can be tuned or changed with one or more inclusion structures 92 that are constructed and arranged to be inserted into and held within one or more of chambers 86 and 90. For example, structure 92 can be used to alter the damping and/or spring constant of the bushing by making the structure from a different material than that of main body portion 93.

Figure 7:
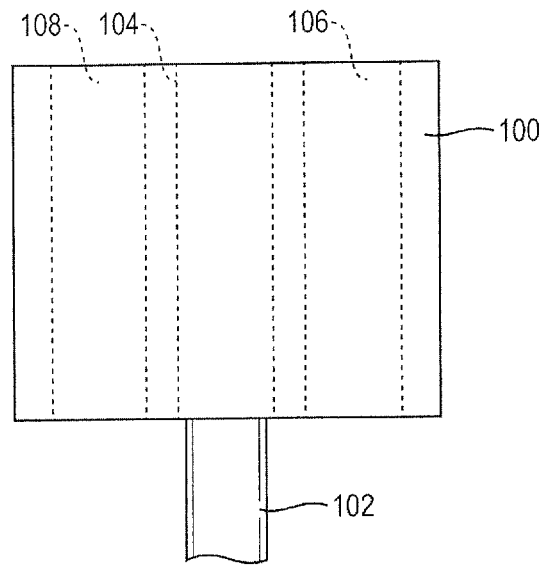
FIG. 7 illustrates a bushing for a headrest.

A simple to construct bushing 100 is shown in FIG. 7. Bushing 100 includes three uniform, cylindrical through-holes 104, 106 and 108. Bushing 100 can be fabricated by extrusion. Opening 104 is the receptacle for support rod 102. The peripheral shape of the bushing can be as desired although in the case of an extruded bushing the shape is more limited than can be the case with a bushing that is molded, machined or made in another fashion.

Figure 8:
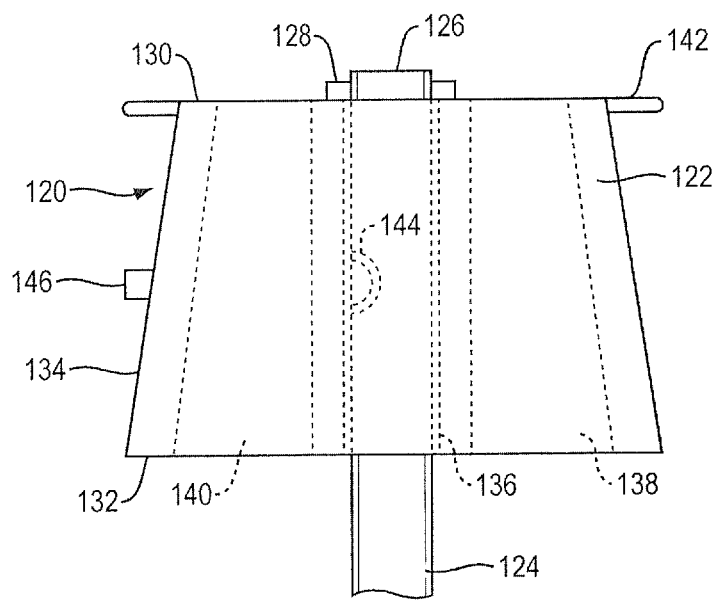
FIG. 8 illustrates a bushing for a headrest.

Bushing 120, FIG. 8, illustrates additional features of a bushing, means by which a support rod is coupled to a bushing, and means by which the bushing can be coupled to the main body portion of the headrest. It is likely that all of the features shown in FIG. 8 would not be included in a single bushing design, but they could be. Bushing main body portion 122 is a unitary molded member typically made from an elastomer that exhibits the energy absorption, compliance and low hysteresis that help to achieve the functional requirements of the headrest as described above. Receptacle 136 is a cavity that is sized and shaped to accept support rod 124. Support rod 124 has top end 126 and adjacent lip 128 that overlies the top 130 of body portion 122 outside of opening 136. An overlying lip such as this helps to prevent the rod from being pulled out of the bushing. A different or potentially additional means of coupling the support rod to the body of the bushing is the inclusion of one or more mechanical structures such as detent 144.

Sidewall 134 that is between top 130 and bottom 132 of bushing body 122 is flared and is straight. The flared sidewall accomplishes different energy absorption and compliance characteristics along the height of the bushing, which can be useful to accomplish the need of headrests to react properly to forces that are applied at different heights of the headrest, particularly in cases such as the present headrest design where the headrest is coupled to the seatback through support rods that don't extend throughout most of the height of the headrest. Also, chambers 138 and 140 are through-hole chambers but are tapered such that their outer wall is parallel to the flared sidewall or periphery of the bushing. Although this is not a limitation of this particular design, the tapered chambers contribute to the variation in the energy absorption, compliance and hysteresis of the bushing along locations from the top to the bottom of the bushing. Further shown in FIG. 8 are mechanical means to help hold the bushing in the bushing-receiving cavity in the main body portion of the headrest. One such mechanical means is one or more external detents 146 that can be adapted to be received in mating receptacles (not shown). Additionally or alternatively, protruding top lip 142 may be included that is constructed and arranged to engage with a structure in the main body portion of the headrest to help retain the bushing in the headrest and inhibit it from being pulled out of the headrest when force is applied through support rod 124, for example when a user is adjusting the height of the headrest.

Figure 9:
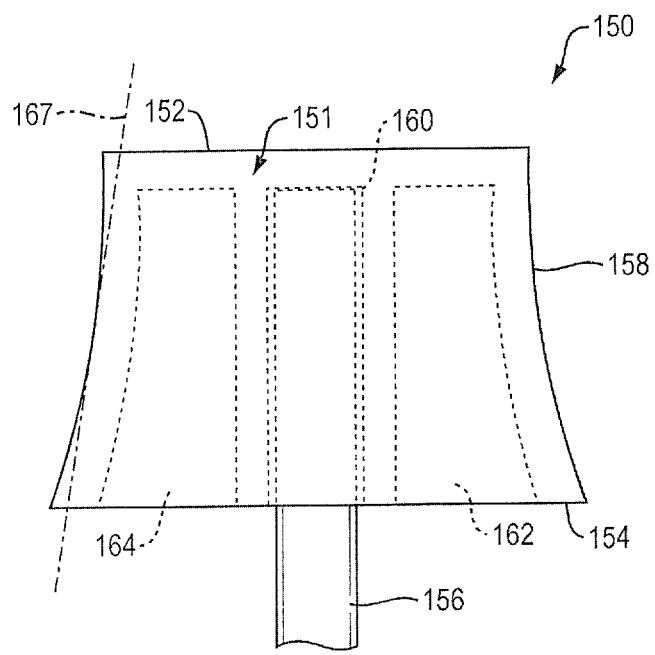
FIG. 9 illustrates a bushing for a headrest.

FIG. 9 illustrates several additional features, any one or more of which can be present in the innovative headrest. Bushing 150 includes top 152 and bottom 154 with concave flared sidewall 158 connecting them. In this design as in others the top and bottom would typically be round or generally oval, but that is not a limitation of the innovation as the peripheral shape of the bushing can be as desired. Receptacle 116 which receives support rod 156 is in this case an embedded cavity that is open to the bottom 154 but is not open to the top 152. Similarly, chambers 162 and 164 are cavities that are open to the bottom but not the top. The flared sidewall 158 and the overall size of main body portion 151 can be such that when the bushing is inserted into a bushing-receiving cavity in the headrest, there is an interference fit created that helps to hold the bushing in the main body portion and also inhibit the bushing from rotating within the main body portion when forces are applied such as during a rear end collision during which the user's head snaps back against the headrest. The interference fit is schematically illustrated in FIG. 9 with internal wall 167 of the bushing receiving cavity (not fully shown); since the body of the bushing is larger than cavity, when the bushing is inserted into the cavity portions of the bushing will be compressed to preload the bushing and help to hold it in the cavity. This preloading may also change the compliance and energy absorption characteristics of the bushing. Note also that if the top of the bushing was larger than the bottom and the cavity was similarly shaped, the bushing would be better retained in the cavity.

Figure 10:
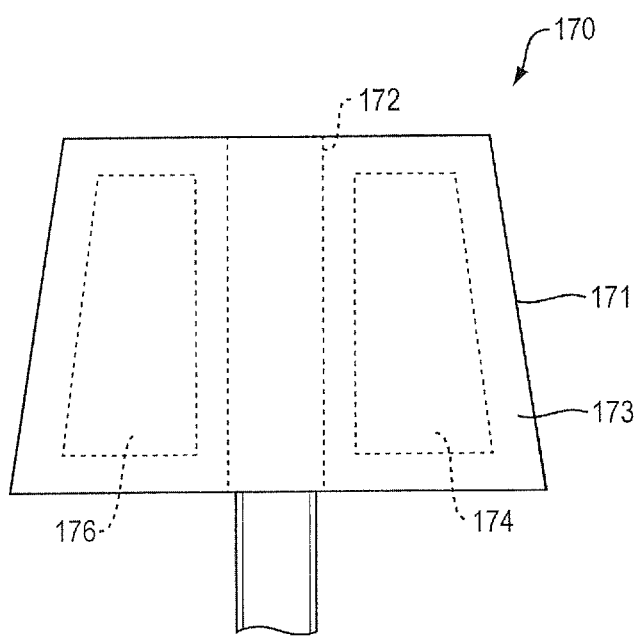
FIG. 10 illustrates a bushing for a headrest.

Bushing 170, FIG. 10, has receptacle 172. Chambers 174 and 176 are closed, i.e., they are completely embedded within the body portion 173 and not at all open to periphery 171 of body 173. Closed chambers such as this could potentially be filled with a different material which could be a fluid or a solid to achieve a desired energy absorption, spring constant and/or hysteresis. In one non-limiting example, the closed chambers are filled with air. Bushing 170 could be made via gas-assisted molding.

Figure 11:
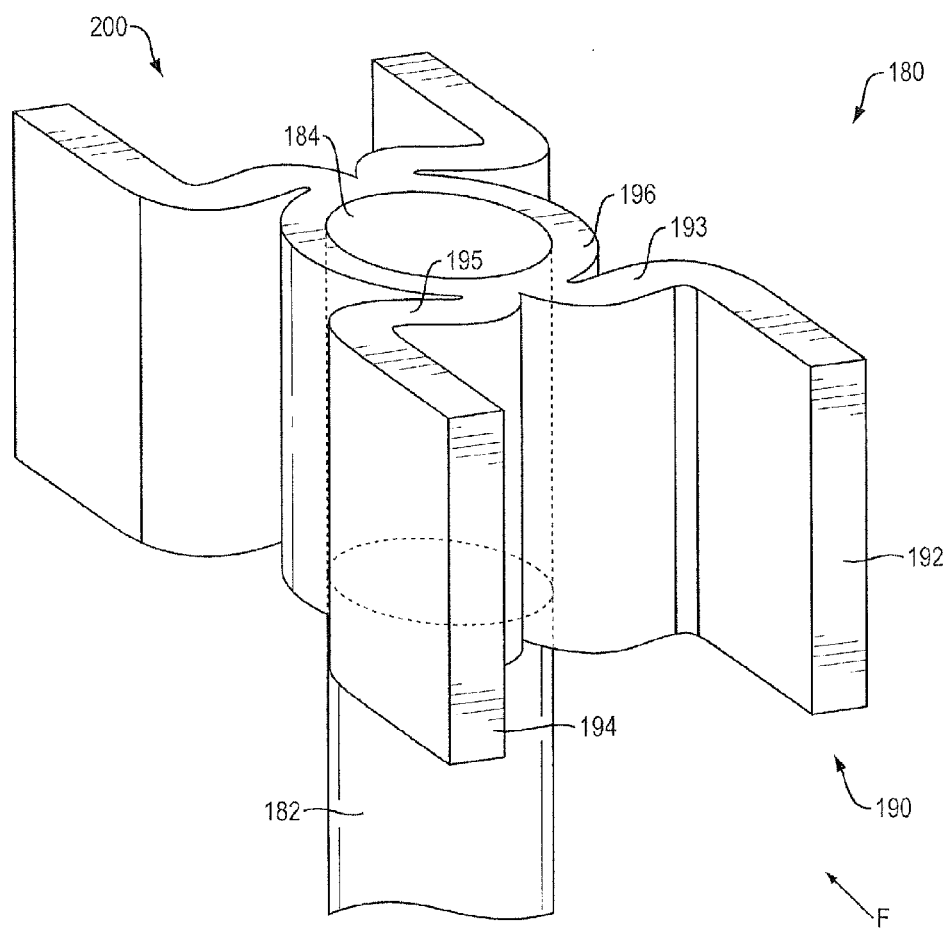
FIG. 11 illustrates a bushing for a headrest.

Bushing 180, FIG. 11, has receptacle 184 for headrest support rod 182. Receptacle 184 is formed within central region 196 which may be a generally cylindrical body. From this body extend front damping structure 190 and rear damping structure 200. The direction of force applied to the front of the headrest is indicated by arrow F. Front damping structure 190 has protruding legs 192 and 194 which are coupled to body 196 by compliant portions 193 and 195.

The bushing or bushings are, in essence, a combined spring and damper. For specific bushing design, a systems approach can be used to consider the headrest, bushing and seat attachment and seat back dynamic response all as one system. For a system with a high spring constant, the bushing design would try to lower geometry-driven stiffness by lengthening the spring and reducing the cross sectional area. Non-limiting examples are shown in FIGS. 6 and 11. Specific to FIG. 6, increasing the size and/or number of circular chambers will lower the spring constant of the design. Specific to FIG. 11, the "S" profile at each corner increases length, while radii in the transmission path of the forces further reduces the spring constant compared to a straight path design. For a system with a low spring constant, material selection could focus primarily on its damping properties to balance the dampening of the system: an under-damped system would have a reaction force and then acceleration on the head in the opposite direction. More generally, the system can be looked at as a free body, with springs and dampers in various combinations of series and/or parallel circuits.

A number of implementations have been described. Nevertheless, it will be understood that additional modifications may be made without departing from the scope of the inventive concepts described herein, and, accordingly, other embodiments are within the scope of the following claims.

What is claimed is:

1. A headrest that is constructed and arranged to be mounted to one or more support rods that are adapted to be coupled to the backrest of a seat of a vehicle, the headrest comprising:
    a main body portion; and
    a separate bushing that is positioned at least partially in the main body portion and that comprises a receptacle comprising a solid material that is adapted to completely surround and receive a portion of a support rod, the bushing constructed and arranged to partially damp forces that enter the bushing through the main body portion, wherein the bushing has a front that faces the head of a person sitting in front of the headrest and a rear that opposes the front, and first and second chambers adjacent to and entirely separate from the receptacle, wherein the first chamber is located between the receptacle and the front of the bushing. and the second chamber is located between the receptacle and the rear of the bushing.

2. The headrest of claim 1 wherein the first and second chambers and the receptacle are located along an axis that is transverse to the front and back of the bushing.

3. The headrest of claim 2 wherein the first and second chambers and the receptacle all have generally the same cross-sectional shape.

4. The headrest of claim 3 wherein the cross-sectional shape is generally circular.

5. The headrest of claim 1 wherein the bushing has a periphery and wherein one or more of the chambers are open to the periphery of the bushing.

6. The headrest of claim 1 wherein the bushing has a periphery and one or more of the chambers are completely embedded in the main body portion and are not open to the periphery.

7. The headrest of claim 1 wherein one or more of the chambers are generally cylindrical.

8. The headrest of claim 1 wherein the bushing has a top and a bottom, wherein the top and bottom are not the same size and wherein the bushing has one or more sidewalls that define the periphery of the bushing between the top and the bottom.

9. The headrest of claim 8 wherein the top is smaller than the bottom and the sidewalls flare outwardly from the top to the bottom.

10. The headrest of claim 9 where the flare follows a generally straight line.

11. The headrest of claim 9 where the flare follows a generally curved line.

12. The headrest of claim 1 wherein the main body portion has a bushing-receiving cavity in which the bushing is located.

13. The headrest of claim 12 wherein the bushing-receiving cavity has a size and a shape and the bushing has a size and a shape, where one or more of the size and shape of the bushing is different from those of the cavity such that when the bushing is inserted into the cavity an interference fit is created.

14. The headrest of claim 12 further comprising structure to assist with maintaining the bushing in the bushing-receiving cavity.

15. The headrest of claim 1 wherein the bushing is at least partially made from elastomeric material.

16. The headrest of claim 1 wherein the receptacle comprises a socket that is adapted to receive and retain an end of a post.

17. A headrest that is constructed and arranged to be mounted to one or more support rods that are adapted to be coupled to the backrest of a seat of a vehicle, the headrest comprising:
a main body portion; and
a separate bushing that is positioned at least partially in the main body portion and that comprises a receptacle comprising a solid material that is adapted to completely surround and receive a portion of a support rod, the bushing constructed and arranged to partially damp forces that enter the bushing through the main body portion, wherein the bushing is made at least in part from an elastomeric material and comprises at least two chambers adjacent to and entirely separate from the receptacle, wherein the bushing has a front that faces the head of a person sitting in front of the headrest and a rear that opposes the front, and wherein a first chamber is located between the receptacle and the front of the bushing and a second chamber is located between the receptacle and the rear of the bushing;
wherein the main body portion has a bushing-receiving cavity in which the bushing is located.

* * * * *